Figure 4:
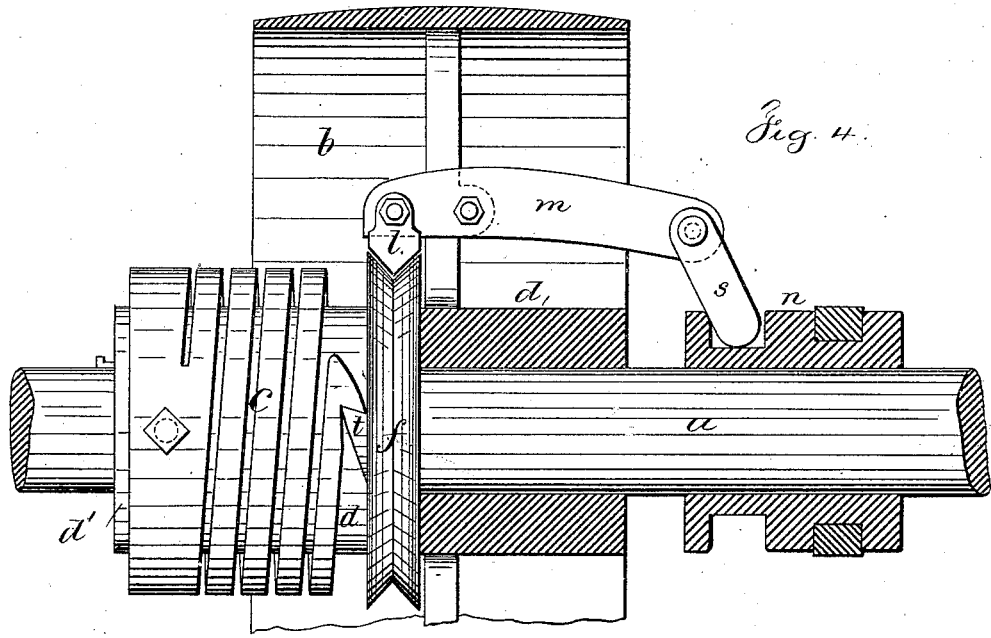

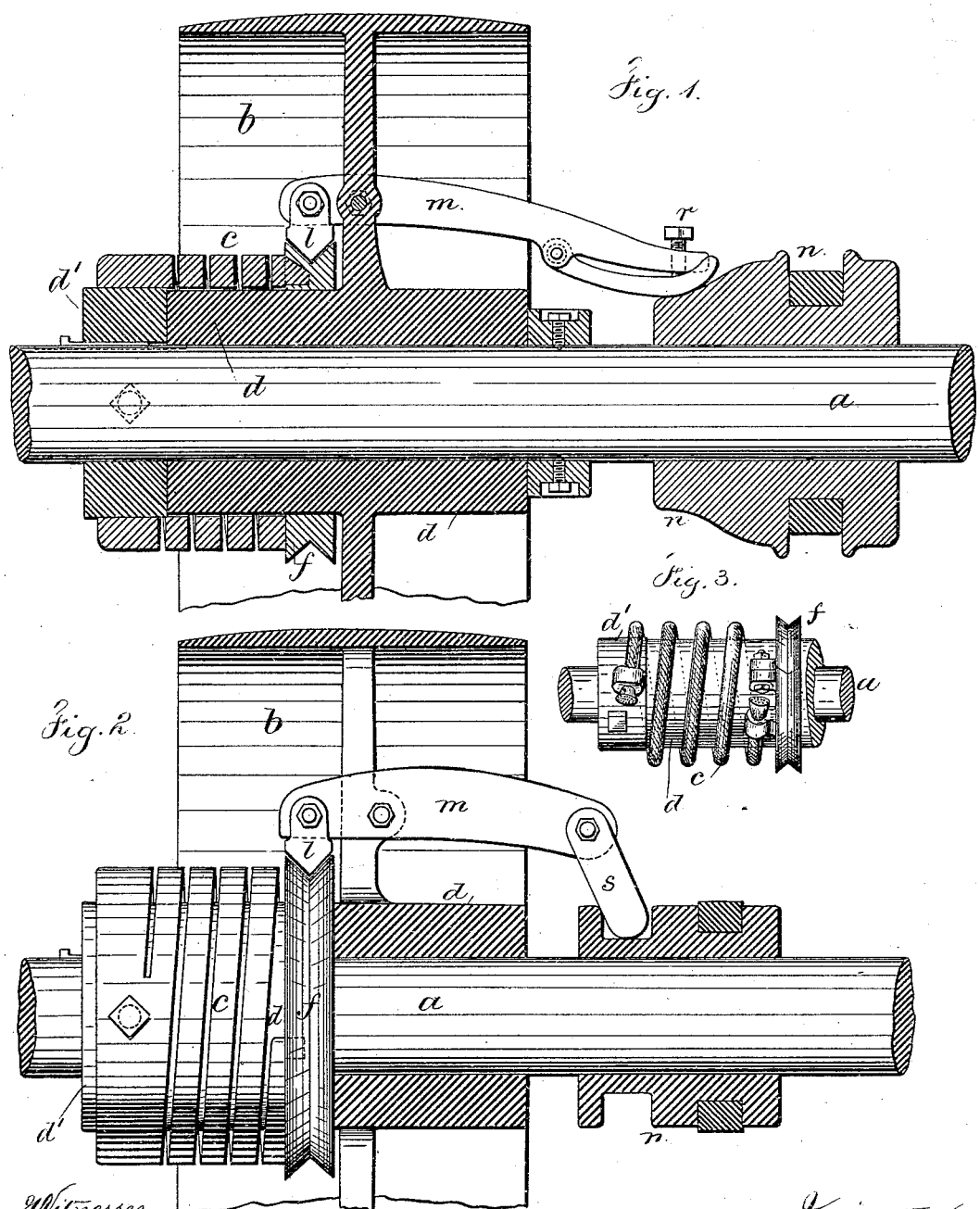

(No Model.) 2 Sheets—Sheet 2.

E. J. STERLING.
FRICTION CLUTCH.

No. 264,785. Patented Sept. 19, 1882.

Witnesses
Chas. H. Smith
Harold Serrell

Inventor
Ezra J. Sterling
per Lemuel W. Serrell
atty.

UNITED STATES PATENT OFFICE.

EZRA J. STERLING, OF BROOKLYN, NEW YORK.

FRICTION-CLUTCH.

SPECIFICATION forming part of Letters Patent No. 264,785, dated September 19, 1882.

Application filed September 19, 1881. Renewed July 17, 1882. (No model.)

*To all whom it may concern:*

Be it known that I, EZRA J. STERLING, of Brooklyn, in the county of Kings and State of New York, have invented an Improvement in Friction-Clutches, of which the following is a specification.

A device for connecting or disconnecting a motor and shaft has been made by the use of a cylindrical helix within a cylindrical shell, and expanding levers within the cylindrical helix act to cause it to adhere by friction to the inside of the shell. This produces a positive engaging device; but no provision is made for one part slipping upon another and so starting the shaft and machinery gradually by an increase of friction upon a clutch intervening between the motor and the mechanism to be moved.

My present invention is an improvement upon the friction-clutches heretofore made; and it consists in combining with a friction-ring and mechanism that forces it into contact with the revolving motor a helix that is connected at one end to the friction-ring and at the other end to the shaft or wheel that is to be turned, said helix surrounding the motor shaft or hub, so that when pressure is applied to the frictional ring the said ring is partially revolved or detained and winds up the helix more or less, to cause it to grasp the motor and be moved thereby and give motion to the shaft or wheel to which the helix is attached. With this improvement the parts are revolved by friction, and there will be more or less movement given to the driven device, according to the force applied to produce the friction that winds up the helix.

In the drawings, Figure 1 is a section of the said friction-clutch, and Fig. 2 is an elevation of the same, the pulley being in section and the lever-clutch being of a different construction from that shown in Fig. 1.

The shaft $a$ is presumed to be connected to the mechanism that is to be driven, and the pulley $b$ to be in constant revolution from the action of a belt or gearing to the prime mover.

The helix $c$ is of a size to surround the cylindrical hub $d$ of the pulley $b$. One end of this helix is permanently connected to the shaft $a$ by the ring or collar $d'$, and the other end is made with a finger or other connection to the ring $f$. This ring $f$ and helix $c$ are loose upon the cylindrical hub $d$ of the pulley $b$. Hence said pulley and hub revolve freely without turning either the ring $f$, the helix, or the shaft $a$; but where pressure is brought to bear against the ring $f$ by a stationary lever and press-block, or by the means hereinafter described, then the revolution of the hub $d$ gives more or less revolution to the ring $f$ and winds up the helix $c$, contracting it upon the hub $d$ in such a manner as to cause the helix to grasp said hub more or less firmly, according to the extent of friction on the ring $f$. Hence the shaft $a$ will be started gradually and turn regularly, there being more or less slip of the helix on the surface of the revolving hub. I employ a ring, $f$, that has a grooved periphery, in which is a presser-block, $l$, hinged to a lever, $m$, the fulcrum of which is upon one arm of the pulley $b$, and the longer arm of the lever is acted upon by the sliding coupling-sleeve $n$ upon the shaft $a$, which sliding ring is moved by the coupling-lever usually employed. The sleeve $n$ and lever $m$ may be connected by a link, $s$, as in Fig. 2, which acts as a toggle-joint; or the sleeve $n$ may be beveled, as seen in Fig. 1, to act beneath and raise the longer end of the lever and apply the pressure to the friction-ring $f$. There should be a shoe at the end of the lever $m$ to take the wear against the coupler-sleeve $n$, and an adjusting-screw, $r$, to move the shoe as the parts wear, and also to adjust the parts to vary the pressure upon the friction-ring.

It will be evident that if the shaft $a$ were continuously revolved and the pulley were the device to be driven the ring $f$ and cylindrical helix will be around the shaft $a$ and the opposite end of the helix be connected to the pulley instead of the collar $d'$.

This improvement is available where a split pulley is applied upon a shaft already in place. In this case the helix is made of a wire rope, as shown in Fig. 3. It is to be understood that the direction in which the helix is wound is to be such that the frictional detention of the ring will cause the helix to be wound more tightly.

In cases where this improvement is applied to a helix that is within a shell the direction in which the helix is wound is to be such that the frictional detention by the ring at the end of the helix shall cause the helix to expand within the shell.

If it is desired to balance the parts, a second lever m and its presser-block l may be applied at the opposite side of the pulley, in which case the friction upon the ring will be applied by the presser-blocks l instead of the hub and presser-block.

In some instances the direction of revolution may be accidentally and temporarily reversed, and the helix might thereby be injured. To prevent this the end of the helix may be connected to the ring by a latch, so that the ring will act to wind up the helix when the parts are revolved in the correct direction; but the parts of the latch will separate when moving in the wrong direction.

Figure 5:
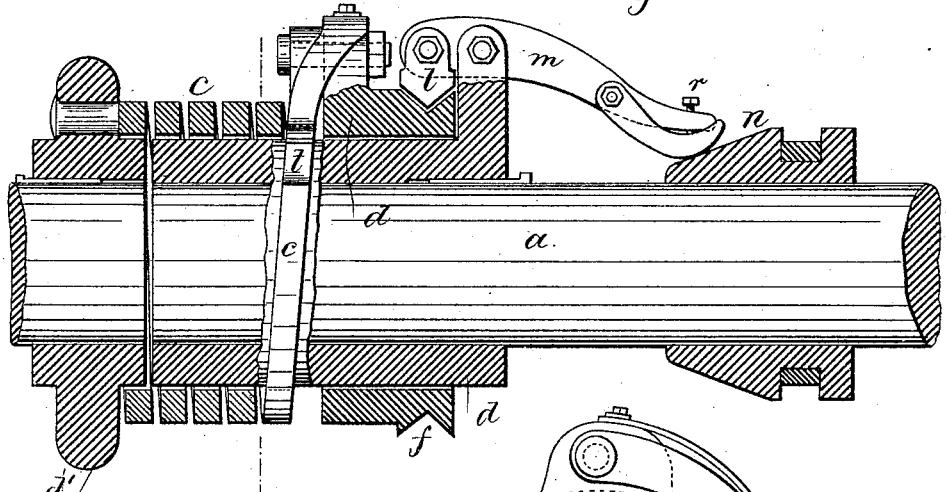
Figure 6:
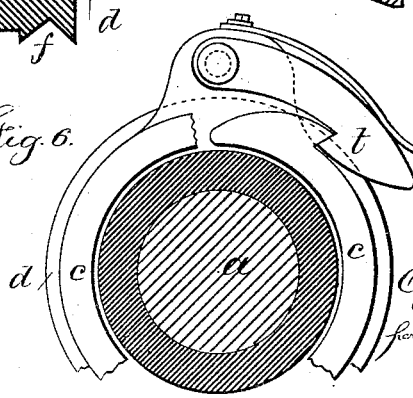

In Fig. 4 the end of the spring is shown as terminating in a beveled hook that engages with a beveled stud, t, on the side of the ring f, and in Figs. 5 and 6 a spring-latch, t, is shown as pivoted to the ring f and engaging the hooked end of the helix.

In cases where the power is to be communicated from one shaft to another that is in line with the driving-shaft the collar d' will be bolted upon the driving-shaft and the helix and ring will revolve with the motor-shaft, and the helix will be wound up and grasp a cylinder or hub keyed on the driven shaft whenever pressure is applied by the lever to grasp the ring between the block l and said hub on the shaft that is to be driven. This construction is represented in Figs. 5 and 6.

I claim as my invention—

1. The combination, with the motor and the shaft or device to be revolved, of a ring, f, mechanism, substantially as described, for applying friction to such ring, and a helix connected at one end to the ring and at the other end to the motor or device to be revolved, substantially as set forth.

2. The combination, in a friction-clutch, of a ring, a friction-pad to act on the ring, a revolving device, a device to be revolved thereby, and a helix of wire rope extending from the ring to the device that is to be revolved, substantially as set forth.

Signed by me this 14th day of September, A. D. 1881.

E. J. STERLING.

Witnesses:
GEO. T. PINCKNEY,
CHAS. H. SMITH.